US011920755B2

(12) United States Patent
Li et al.

(10) Patent No.: US 11,920,755 B2
(45) Date of Patent: Mar. 5, 2024

(54) AUTOMOTIVE HEADLAMP SYSTEM AND AUTOMOTIVE LAMP

(71) Applicant: HASCO VISION TECHNOLOGY CO., LTD., Shanghai (CN)

(72) Inventors: Meng Li, Shanghai (CN); Zhaoyu Chen, Shanghai (CN); Ying Li, Shanghai (CN); Xiangqian Chen, Shanghai (CN); He Zhu, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/025,764

(22) PCT Filed: Aug. 31, 2021

(86) PCT No.: PCT/CN2021/115668
§ 371 (c)(1),
(2) Date: Mar. 10, 2023

(87) PCT Pub. No.: WO2022/068504
PCT Pub. Date: Apr. 7, 2022

(65) Prior Publication Data

US 2023/0349530 A1 Nov. 2, 2023

(30) Foreign Application Priority Data

Sep. 29, 2020 (CN) ......................... 202011046942.5

(51) Int. Cl.
*F21S 41/63* (2018.01)
*F21S 41/20* (2018.01)

(52) U.S. Cl.
CPC .......... *F21S 41/635* (2018.01); *F21S 41/285* (2018.01)

(58) Field of Classification Search
CPC .............................. F21S 41/285; F21S 41/635
See application file for complete search history.

(56) References Cited

U.S. PATENT DOCUMENTS 5,138,540 A * 8/1992 Kobayashi ............ F21S 41/635 362/466
10,962,191 B1 * 3/2021 Go ........................ F21S 41/255
(Continued)

FOREIGN PATENT DOCUMENTS

CN 208997963 U 6/2019
CN 210637967 U 5/2020
(Continued)

OTHER PUBLICATIONS

Wang Junwei et al.; Design of single module LED-based integrated headlamp system; Infrared and Laser Engineering, vol. 44, No. 9, Sep. 2015; pp. 2710-2715.

*Primary Examiner* — Thomas M Sember
(74) *Attorney, Agent, or Firm* — Volpe Koenig

(57) ABSTRACT

An automotive headlamp system and an automotive lamp. The automotive headlamp system comprises a light source, a primary optical element, an automotive signal lamp structure, and a secondary optical element arranged sequentially along the light emitting direction. The automotive signal lamp structure comprises a light-transmitting portion and a rotating shaft. The light-transmitting portion comprises at least one light-transmitting plate mounted on the rotating shaft which can be driven to rotate by the rotating shaft. By means of rotation, light from the light source exits from the primary optical element, then selectively passes through one of or none of the light-transmitting plates, and is then projected by means of the secondary optical element to achieve a corresponding signal lamp function. The light-transmitting plate mounted on the rotating shaft is used to
(Continued)

replace an existing signal lamp, reducing the space occupied by the original signal lamp, decreasing the volume of a headlamp.

18 Claims, 10 Drawing Sheets

(56) References Cited

U.S. PATENT DOCUMENTS

| | | | | |
|---|---|---|---|---|
| 2011/0235349 | A1* | 9/2011 | Nakaya | F21S 41/663 362/543 |
| 2013/0141928 | A1* | 6/2013 | Puente | F21S 43/37 362/235 |
| 2014/0301084 | A1* | 10/2014 | Yen | F21S 41/285 362/284 |
| 2018/0073700 | A1 | 3/2018 | Orisich et al. | |

FOREIGN PATENT DOCUMENTS

| | | | |
|---|---|---|---|
| CN | 111473301 | A | 7/2020 |
| CN | 111486404 | A | 8/2020 |
| CN | 112539392 | A | 3/2021 |
| DE | 10204481 | A1 | 8/2003 |
| DE | 102015205510 | A1 | 9/2016 |
| EP | 1431654 | A1 | 6/2004 |
| EP | 2784376 | A2 | 10/2014 |
| EP | 3343096 | A1 | 7/2018 |

* cited by examiner

AUTOMOTIVE HEADLAMP SYSTEM AND AUTOMOTIVE LAMP

CROSS REFERENCE TO RELATED APPLICATIONS

This application is a 35 USC § 371 National Stage application of International Patent Application No. PCT/CN2021/115668, which was filed Aug. 31, 2021, entitled "AUTOMOTIVE HEADLAMP SYSTEM AND AUTOMOTIVE LAMP" and claims priority to Chinese Patent Application No. 202011046942.5 filed on Sep. 29, 2020, which are incorporated herein by reference as if fully set forth.

FIELD OF THE INVENTION

The present disclosure relates to a vehicle lighting device, and particularly relates to an automotive headlamp system. In addition, the present disclosure further relates to an automotive lamp with the automotive headlamp system.

BACKGROUND OF THE INVENTION

A common automotive headlamp system is usually composed of passing beams, driving beams, front position lamps, front turning lights and daytime running lights (DRL). The passing beams and the driving beams are the main parts of headlamps, and the position lamps (PL), the turning lights (TL) and the DRL are signal lamps related to vehicle's safety.

The DRL is a forward-facing lamp that makes a vehicle more visible when the vehicle is running in the daytime. The front PL is a forward-facing signal lamp among the PLs, which is used for indicating the presence and approximate width of a vehicle. The TL is an important indicator lamp that is turned on when a vehicle turns to alert other vehicles and pedestrians in all directions (i.e., on the front, back, left and right of the vehicle).

At present, in the automotive headlamp system, the DRL, the front PL and the TL are usually independent of a driving beam module and a passing beam module, which increases the space volume of the headlamp, thus limiting the diversification of the modeling and design of automotive lamps. In addition, the structure is usually formed by the direct combination of a light-emitting diode (LED) light source and a light guide, which has a single form and function. As a result, an automotive lamp cannot be designed to be smaller in volume and more diversified in shape.

SUMMARY OF THE INVENTION

In a first aspect, the problem to be solved by the present disclosure is to provide an automotive headlamp system. The automotive headlamp system uses an automotive signal lamp structure to replace a signal lamp, which decreases the overall volume and satisfies requirements on the miniaturization of an automotive lamp.

In a second aspect, the problem to be solved by the present disclosure is to provide an automotive lamp. The automotive lamp uses an automotive signal lamp structure to replace a signal lamp, which decreases the overall volume and satisfies requirements on the miniaturization.

In order to achieve the above objective, an automotive headlamp system is provided in the first aspect of the present disclosure. The automotive headlamp system includes light sources, a primary optical element, an automotive signal lamp structure, and a secondary optical element, which are arranged in sequence along the light emitting direction. The automotive signal lamp structure includes a light-transmitting portion and a rotating shaft. The light-transmitting portion includes at least one light-transmitting plate. The light-transmitting plate is mounted on the rotating shaft and can be driven to rotate by the rotating shaft so that, by means of rotation, light from the light sources exits by means of the primary optical element, then selectively passes through one of the light-transmitting plates or does not pass through any one of the light-transmitting plates, and then is projected by means of the secondary optical element to achieve a corresponding signal lamp function or lighting function.

Preferably, the light-transmitting portion includes a plurality of light-transmitting plates, and the plurality of light-transmitting plates are different in material and/or shape.

Preferably, the light-transmitting portion includes a plurality of light-transmitting plates, and the plurality of light-transmitting plates are selected from one or more of flat plates and curved plates with curved light entering surfaces and/or curved light emitting surfaces.

Preferably, the light-transmitting portion includes two or three light-transmitting plates.

Preferably, a top of the rotating shaft is not higher than a bottom of the primary optical element, or a bottom of the rotating shaft is not lower than a top of the primary optical element.

Preferably, the primary optical element includes a light entering portion, a light guiding portion and a light emitting portion, which are arranged in sequence along the light emitting direction and are formed into a whole. The light entering portion includes a plurality of light condensing structures in one-to-one correspondence with the light sources. Convex cylinders in one-to-one correspondence with the light condensing structures are formed on the light emitting portion, and extend along an up-down direction.

Further preferably, the light condensing structures are light condensing cup structures.

Preferably, the secondary optical element includes a plurality of light entering surfaces and one light emitting surface. The plurality of light entering surfaces are formed as convex curved surfaces that are in one-to-one correspondence with the light sources and protrude towards the primary optical element. The light emitting surface is a smooth curved surface.

Further preferably, the light emitting surface is a smooth curved surface which is formed in such a way that a vertical generating line moves along a preset curve. The vertical generating line is a convex curve protruding away from the primary optical element.

Preferably, the light sources are configured to be independently turned on and turned off.

An automotive lamp is provided in the second aspect of the present disclosure. The automotive lamp includes the above automotive headlamp system.

By means of the above technical solutions, the present disclosure has the following beneficial effects:

1. The light-transmitting plate mounted on the rotating shaft is used to replace a signal lamp in the existing technology, thereby reducing the space occupied by the original signal lamp, greatly decreasing the volume of a headlamp, and satisfying requirements on the miniaturization of an automotive lamp. Meanwhile, a novel signal lamp structure is provided, which enriches the design of the automotive lamp. In addition, the primary optical element including the light condensing structures and the convex cylinders can form light spots with a smaller width to prevent mutual fusion of adjacent light spots and improve the resolution of a light shape.

2. In preferable implementations of the present disclosure, the plurality of light-transmitting plates that are different in materials and/or different shapes are used, so that the same automotive signal lamp structure can realize various signal lamp functions, which further decreases the volume of the headlamp.

3. In preferable implementations of the present disclosure, due to the setting that the light emitting surface of the secondary optical element is the smooth curved surface, the light emitting surface of the secondary optical element can be designed to be a curved surface adapting to the shape of a vehicle.

Figure 1:
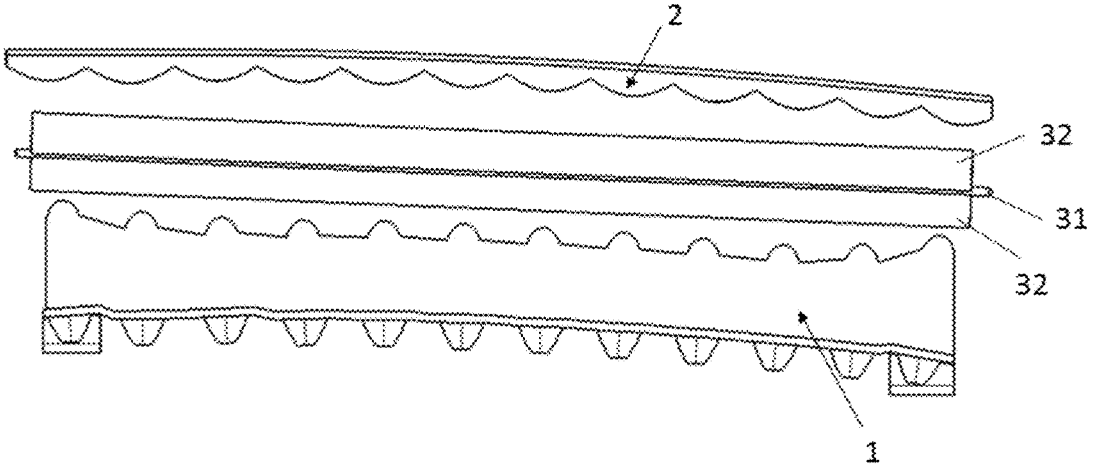
FIG. 1 is a schematic diagram of a first working state of an automotive headlamp system in an embodiment of the present disclosure.

Reference signs in the drawings:

| | | | |
|---|---|---|---|
| 1 | primary optical element | 11 | light condensing structure |
| 12 | light guiding portion | 13 | convex cylinder |
| 2 | secondary optical element | 21 | light entering surface |

-continued

Reference signs in the drawings:

| | | | |
|---|---|---|---|
| 22 | light emitting surface | 31 | rotating shaft |
| 32 | light-transmitting plate | | |

DETAILED DESCRIPTION OF THE EMBODIMENTS

Specific embodiments of the present disclosure will be described in detail below with reference to the accompanying drawings. It should be understood that the specific embodiments described herein are only used to illustrate and explain the present disclosure, and are not intended to limit the present disclosure.

First of all, it should be noted that in the following descriptions, in order to clearly explain the technical solutions of the present disclosure, some orientation words, such as “up”, “down”, “left”, “right”, “front”, and “rear”, are all analogized according to normal orientations indicated by the vehicle when an automotive headlamp system is applied to the vehicle. For example, the orientation where a vehicle head is located refers to front, and the orientation where a vehicle tail is located refers to rear. According to Chinese driving habit, the orientation where a cab is located refers to left, and the orientation where an assistant driver seat is located refers to right, the orientation where vehicle’s roof is located refers to top, and the orientation where wheels are located refers to bottom. The “light emitting direction” refers to an irradiating direction of emitted light of the automotive headlamp system, which can be set according to the lighting function of an automotive lamp to be realized. For example, the light emitting directions of low and driving beams point to the front of a vehicle, while the light emitting directions of cornering lamps slantways point to the outside of the vehicle. These descriptions are only used to facilitate the description of the present disclosure and simplify the description, instead of indicating or implying that the device or element indicated has to have specific orientations and be constructed and operated in specific orientations, and thus cannot be understood as limitations to the present disclosure.

In the description of the present disclosure, it should be noted that the term “mount” should be understood in a broad sense unless otherwise specified and limited. For example, it may be fixed connection, detachable connection, or integrated connection, or may be direct connection or indirect connection through an intermediate connector, or may be internal connection of two elements or interaction between two elements. For those of ordinary skill in the art, the specific meanings of the above terms in the present disclosure can be understood according to specific situations.

As shown in FIG. 1 to FIG. 19, an automotive headlamp system of the present disclosure includes a light source 4, a primary optical element 1, an automotive signal lamp structure, and a secondary optical element 2, which are arranged in sequence along the light emitting direction. The automotive signal lamp structure includes a light-transmitting portion and a rotating shaft 31. The light-transmitting portion includes at least one light-transmitting plate 32. The light-transmitting plate 32 is mounted on the rotating shaft 31 and can be driven to rotate by the rotating shaft 31 so that, by means of rotation, after emitted by means of the primary optical element 1, light from the light sources 4 selectively passes through one of the light-transmitting plates 32, and then is projected by means of the secondary optical element

2 to achieve a corresponding signal lamp function, or the light is projected by means of the secondary optical element 2 without passing through any one of the light-transmitting plates 32, to achieve a corresponding signal lamp function or lighting function. That is, when no signal lamp is required, the light from the light sources 4 does not pass through the light-transmitting plates 32 after being emitted by the primary optical element 1, but directly exits as illumination light by means of the secondary optical element 2. The illumination light can be driving beam illumination light and/or passing beam illumination light. When a signal lamp is required, by means of rotating the automotive signal lamp structure, light passes through one of the light-transmitting plates 32 adaptive to the signal lamp function to be realized, thereby obtaining desired light of the signal lamp. The light sources 4 are common LED light sources or lighting sources of other automotive lamps. In order to realize an Adaptive Driving Beam (ADB) function, the light sources are configured to be independently turned on and turned off.

The rotating shaft 31 is driven to rotate in a drive manner in the existing technology, for example, a servo motor directly drives the rotating shaft 31 to rotate, which belongs to the prior art, is not an innovative point of the present application, and therefore will not be described in detail.

Figure 11:
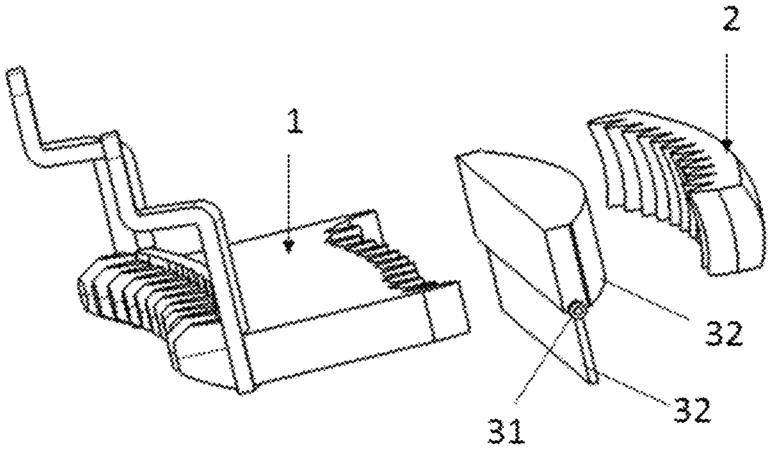
FIG. 11 is a schematic diagram of an automotive headlamp system in a second embodiment of the present disclosure.
Figure 12:
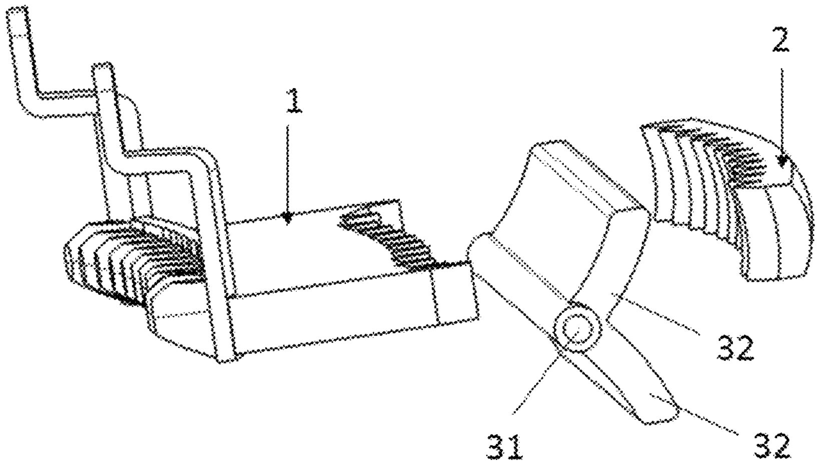
FIG. 12 is a schematic diagram of an automotive headlamp system in a third embodiment of the present disclosure.
Figure 13:
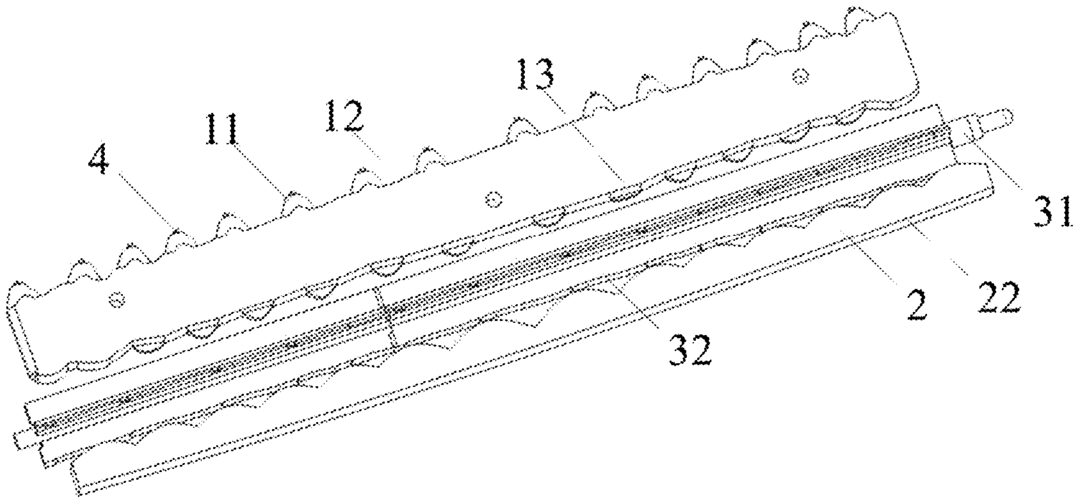
FIG. 13 is a schematic diagram of a fourth working state of an automotive headlamp system in an embodiment of the present disclosure.
Figure 14:
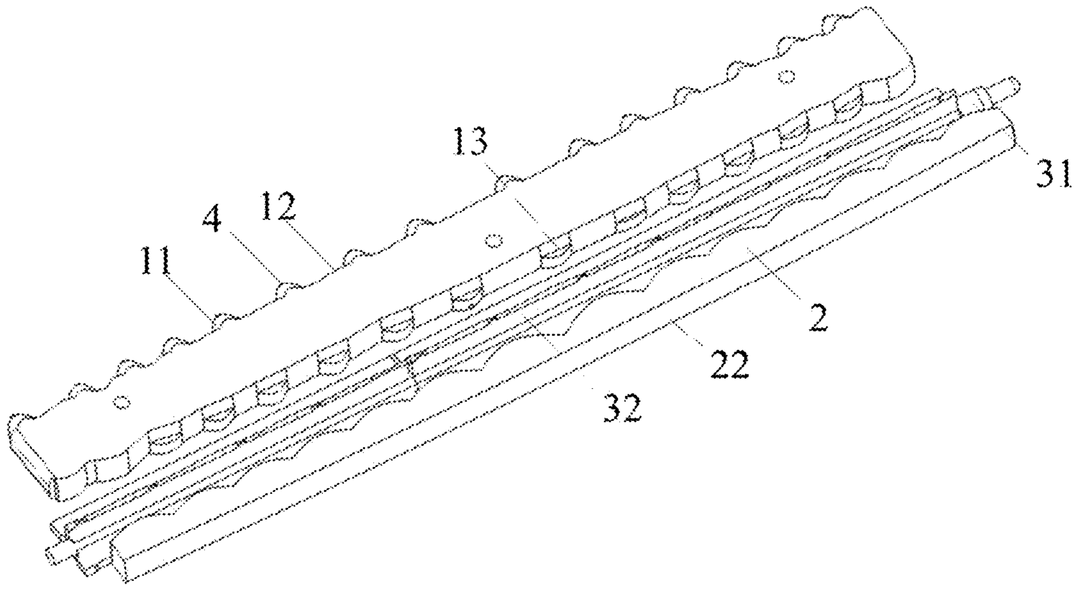
FIG. 14 is a schematic diagram of a fifth working state of an automotive headlamp system in an embodiment of the present disclosure.
Figure 15:
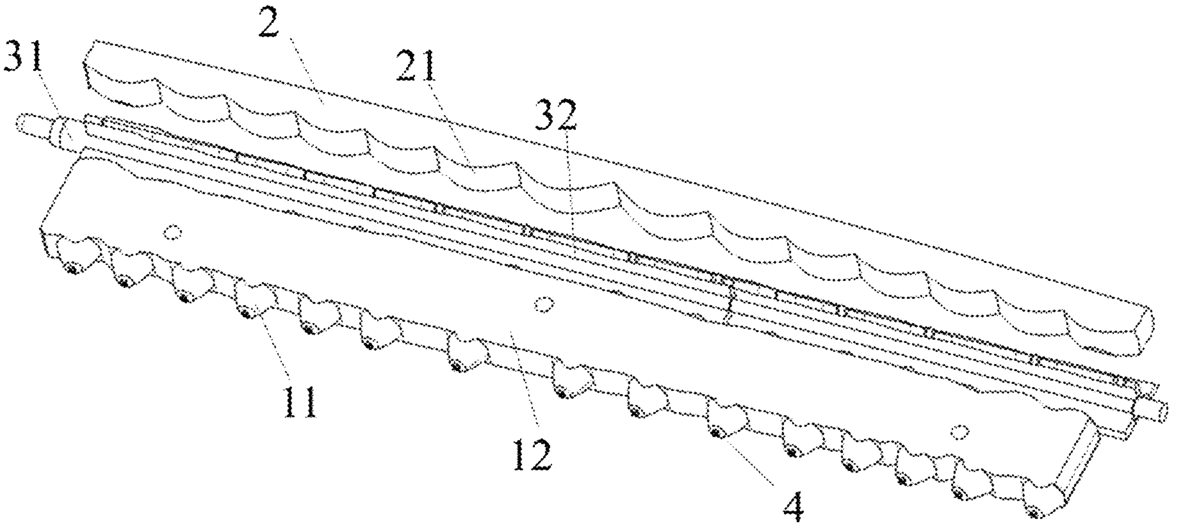
FIG. 15 is a schematic diagram of FIG. 14 seen from a side.
Figure 16:
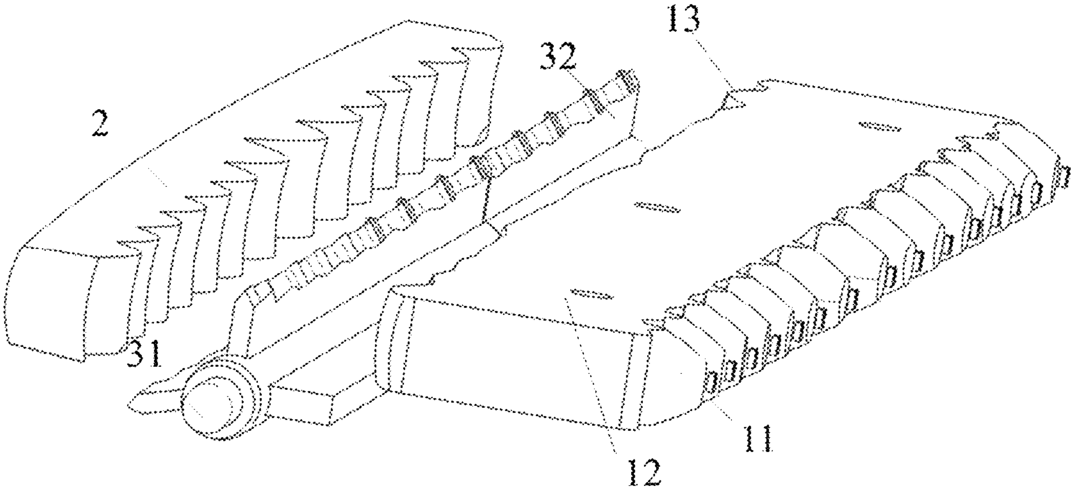
FIG. 16 is a schematic diagram of a sixth working state of an automotive headlamp system in an embodiment of the present disclosure.
Figure 17:
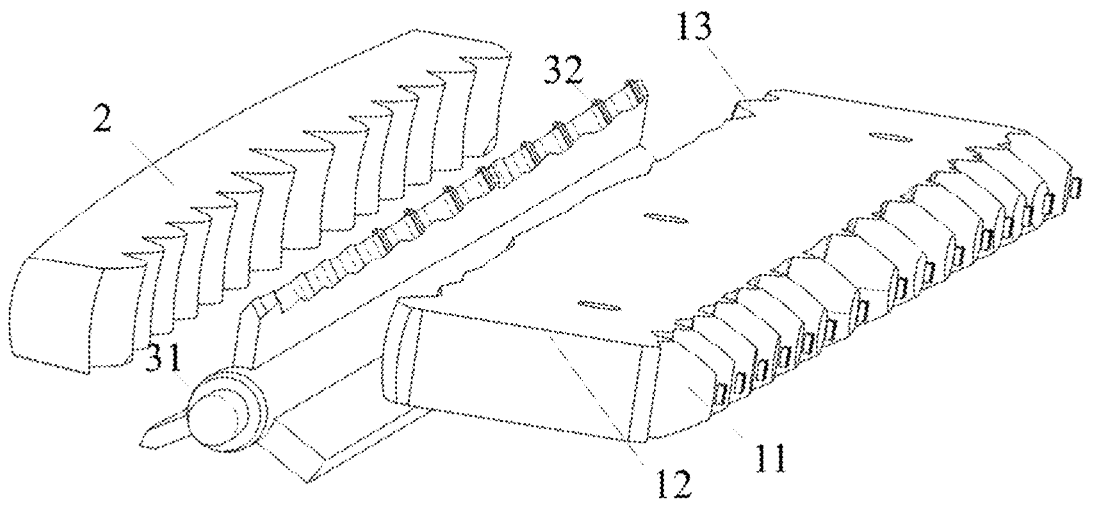
FIG. 17 is a schematic diagram of a seventh working state of an automotive headlamp system in an embodiment of the present disclosure.
Figure 18:
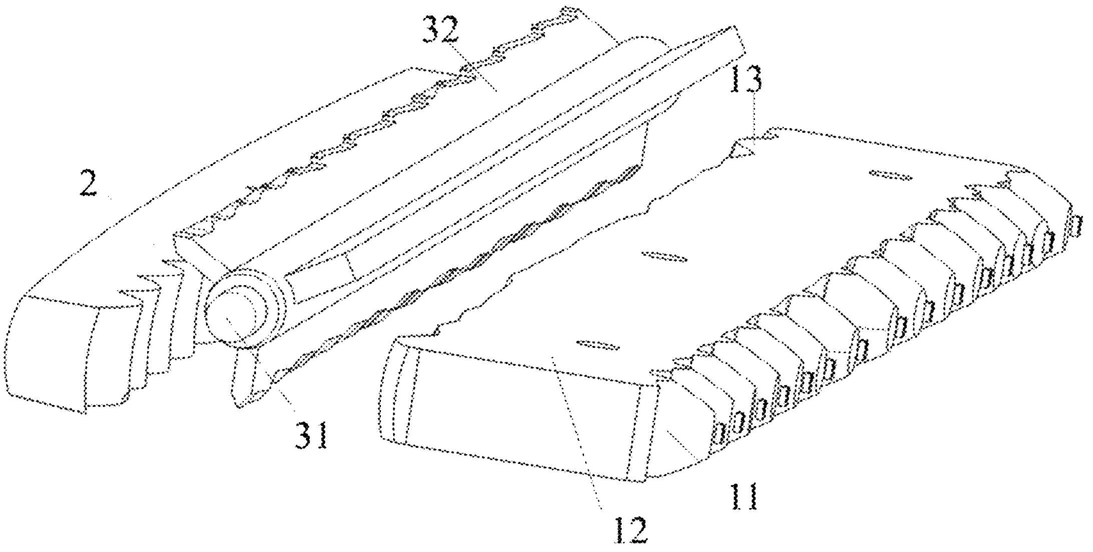
FIG. 18 is a schematic diagram of a eighth working state of an automotive headlamp system in an embodiment of the present disclosure.
Figure 19:
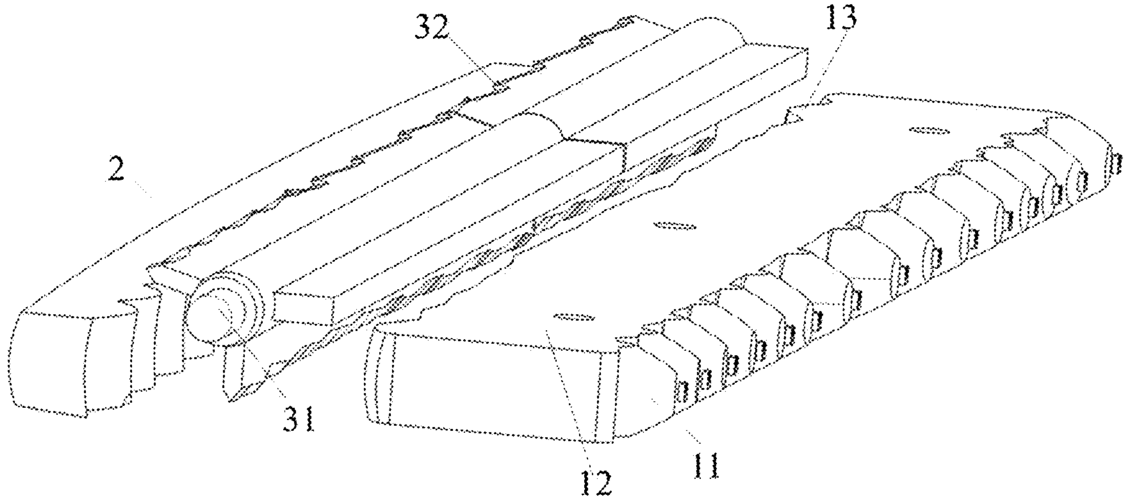
FIG. 19 is a schematic diagram of a ninth working state of an automotive headlamp system in an embodiment of the present disclosure.

The light-transmitting plate 32 has certain light transmittance and light diffusion functions to make light meet the light intensity and uniformity requirements of a signal lamp. That is, the light-transmitting plate 32 is made of light-transmitting materials with certain light transmittance, for example, may employs traditional optical plastic such as PC (polycarbonate) and PMMA (polymethylmethacrylate). The light-transmitting plate 32 may also be made of light scattering materials (such as PC-based light scattering material or PMMA-based light scattering material). In order to make the automotive signal lamp structure to realize various signal lamp functions including a daytime running light, a front position lamp and a turning light, the light-transmitting portion includes a plurality of light-transmitting plates 32. The plurality of light-transmitting plates 32 are made of light-transmitting materials with different shapes and/or textures according to the light distribution requirements of different signal lamps (including light intensity requirements, light chromaticity requirements, etc.). The shape includes a thickness of the light-transmitting plate 32, shapes of a light entering surface and a light emitting surface, and other features. Specifically, the plurality of light-transmitting plates 32 are selected from one or more of flat plates as shown in FIG. 1 to FIG. 10, and curved panels with curved light entering surfaces and/or light emitting surfaces as shown in FIG. 11 to FIG. 12.

In order to achieve the functions of the three types of signal lamps, i.e., the daytime running light, the front position lamp and the turning light by using the automotive signal lamp structure, the light-transmitting portion preferably includes two or three light-transmitting plates 32. When two light-transmitting plates are used, the daytime running light and the front position lamp can share one light-transmitting plate 32 due to only different light intensity requirements. The functions of the daytime running light and the front position lamp can be realized by adjusting the luminous flux of the light sources. However, the turning light has different light chromaticity requirements from the daytime running light and the front position lamp, so that it is required to use a separate light-transmitting plate 32 with a different material to achieve the function of the turning light.

Figure 2:
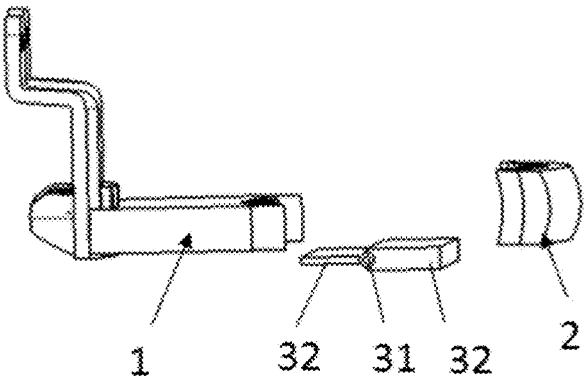
FIG. 2 is a side view of FIG. 1.
Figure 9:
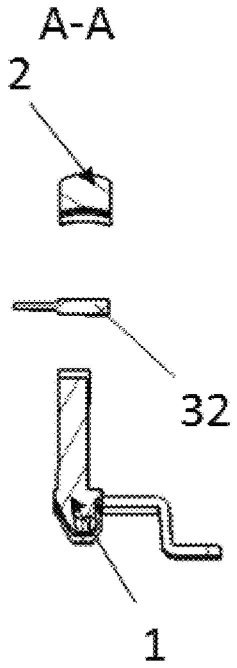
FIG. 9 is a cutaway view along A-A of FIG. 8.
Figure 10:
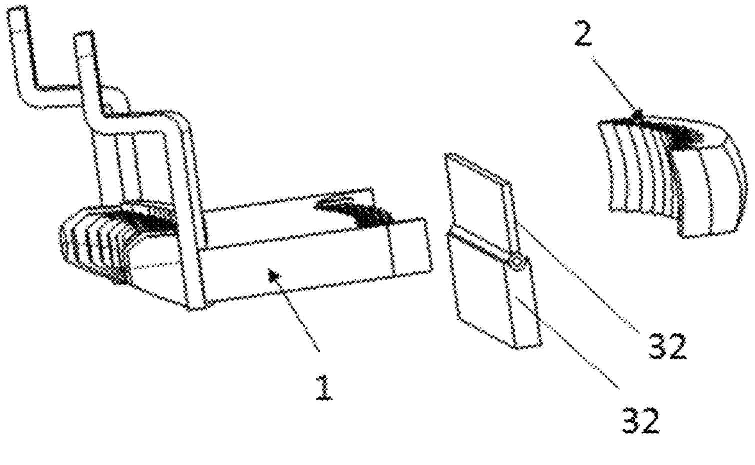
FIG. 10 is a schematic diagram of a third working state of an automotive headlamp system in an embodiment of the present disclosure.

In order to ensure the light utilization rate of the automotive headlamp system, as shown in FIG. 1 to FIG. 19, the location of the rotating shaft 31 is set as follows: a top of the rotating shaft 31 is not higher than a bottom of the primary optical element 1, or a bottom of the rotating shaft 31 is not lower than a top of the primary optical element 1, thereby ensuring that the above signal lamp structure does not shield emitted light of the primary optical element 1 when a lighting function is realized, and the emitted light of the primary optical element 1 can pass through the light-transmitting plates 32 when the functions of the signal lamps are realized. As shown in FIG. 2 and FIG. 9, the top of the rotating shaft 31 and the bottom of the primary optical element 1 are located on the same plane, so that the entire region of the light-transmitting plate 32 can play the role of light transmission to avoid the existence of ineffective regions. In this case, in order to realize the functions of the three types of signal lamps, i.e., the daytime running light, the front position lamp and the turning light, there may be two or three light-transmitting plates 32. When there are two light-transmitting plates, an included angle between the two light-transmitting plates 32 is preferably greater than or equal to 90°, so as to meet such a requirement that when one of the light-transmitting plates 32 works, the other light-transmitting plate 32 will not produce disturbance. As shown in FIG. 13 to FIG. 19, when there are three light-transmitting plates 32, the three light-transmitting plates 32 are preferably arranged in a T-shape or an included angle between two adjacent light-transmitting plates 32 is 120°, which can also ensure that when one of the light-transmitting plates 32 works, the other two light-transmitting plates 32 will not produce disturbance.

In order to achieve a better lighting effect, as one preferable embodiment of the present disclosure, specifically, a primary optical element 1 includes a light entering portion, a light guiding portion 12 and a light emitting portion, which are arranged in sequence along the light emitting direction and are formed into a whole. The light entering portion includes a plurality of light condensing structures 11 that are in one-to-one correspondence with light sources 4. Convex cylinders 13 that are in one-to-one correspondence with the light condensing structures 11 are formed on the light emitting portion, and extend along an up-down direction. The light condensing structures 11 may be light condensing cup structures with external contours in a shape of a light condensing cup or may also be other structures with a light condensing function. The primary optical element 1 with this structure can form light spots with a smaller width to prevent mutual fusion of adjacent light spots and improve the resolution of a light shape. Light emitted from the light sources 4 is converged and collimated by the light condensing structures 11, and is then transmitted by the light guiding portion 12 to the corresponding convex cylinders 13. The light around is converged by the convex cylinders 13, is then emitted to the secondary optical element 2, and is projected by the secondary optical element 2 to form light spots corresponding to the light sources 4. A plurality of light spots are arranged and stacked to form a light shape.

The secondary optical element 2 includes a plurality of light entering surfaces 21 and one light emitting surface 22. The plurality of light entering surfaces 21 are formed as convex curved surfaces that are in one-to-one correspondence with the light sources 4 and protrude towards the primary optical element 1. The light emitting surface 22 is a smooth curved surface, which may be, for example, a smooth curved surface which is formed in such a way that a vertical generating line moves along a preset curve. The vertical generating line is a convex curve protruding away from the primary optical element, and is a longitudinal sectional line of the light emitting surface 22. The shapes of the vertical bus and the set curve can be formed according to a modeling requirement for an automotive lamp. Each light entering surface 21 and the light emitting surface 22 form an optical structure having a focal point, which functions like a convex lens.

In a second aspect of the present disclosure, an automotive lamp is provided, and includes the above automotive headlamp system.

It should be noted that the above automotive signal lamp structure of the present disclosure can not only be used in the automotive headlamp system with a small-sized light emitting window as shown in FIG. 1 to FIG. 12, but also be used in existing other passing beam modules, driving beam modules and passing-beam-and-driving-beam integrated modules.

One preferred embodiment of applying the automotive signal lamp structure of the present disclosure to a driving beam module is described below.

As shown in FIG. 1 to FIG. 10, the driving beam module includes light sources, a primary optical element 1, an automotive signal lamp structure, and a secondary optical element 2, which are arranged from back to front in sequence. The primary optical element 1 includes a light entering portion, a light guiding portion 12 and a light emitting portion, which are arranged in sequence along a light emitting direction and are formed into a whole. The light entering portion includes a plurality of light condensing structures 11 in a shape of a light condensing cup. The light emitting portion includes a plurality of convex cylinders 13 which are arranged at intervals and extend along an up-down direction, and the shape of the light emitting portion mainly depends on a driving beam function of the module. The light condensing structures 11 are in one-to-one correspondence with the light sources, and the convex cylinders 13 are in one-to-one correspondence with the light condensing structures 11. The secondary optical element 2 is a narrow and long light guiding body, a light emitting surface 22 of which is a smooth convex curved surface (according to the modeling requirement of an automotive lamp) formed by sweeping of an arc line along a set curve. The secondary optical element 2 includes a plurality of light entering surfaces 21 which are connected continuously and protrude towards the primary optical element 1. The light entering surfaces 21 are in one-to-one correspondence with the convex cylinders 13. Light emitted from the light sources is converged and collimated by the light condensing structures 11, and is then transmitted by the light guiding portion 12 to the corresponding convex cylinders 13. The light from the light sources around is converged by the convex cylinders 13, is then emitted to the secondary optical element 2, and is projected by the secondary optical element 2 to form light spots corresponding to the light sources, and a plurality of light spots are arranged and stacked to form a light shape of driving beam, so that an ADB function can be realized by means of turning on and turning off the light sources. The automotive signal lamp structure includes two light-transmitting plates 32 arranged at 180°. The two light-transmitting plates 32 are made of different materials. One of the light-transmitting plates 32 can transmit white light to realize the function of the daytime running light or the front position lamp, and the other light-transmitting plate 32 can transmit yellow light to realize the function of the turning light. The two light-transmitting plates 32 are respectively located on two sides of the rotating shaft 31.

Figure 3:
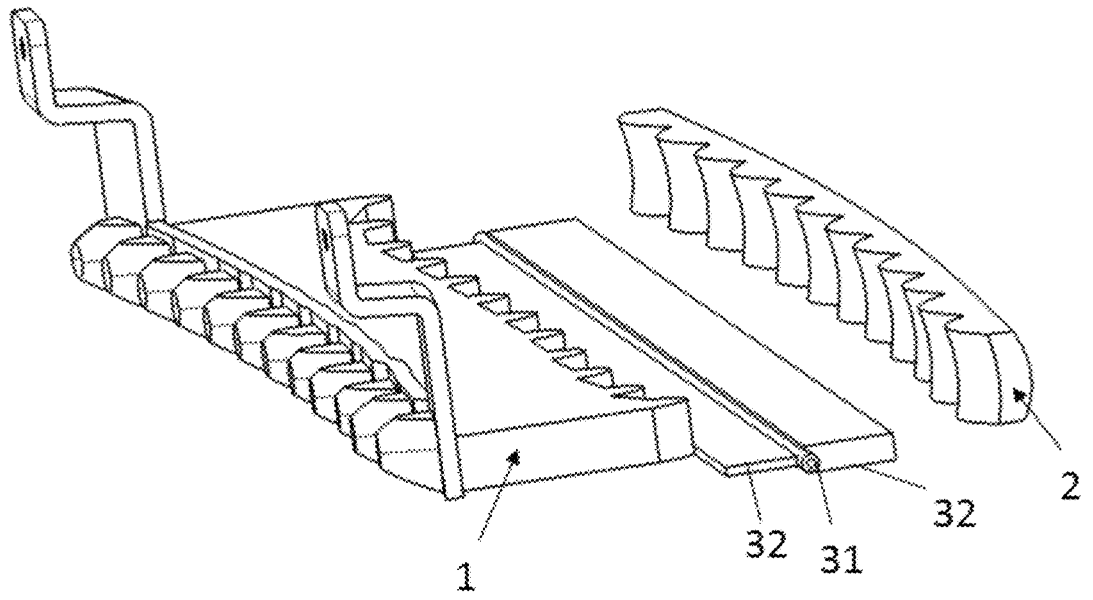
FIG. 3 is a stereogram of FIG. 1.
Figure 4:
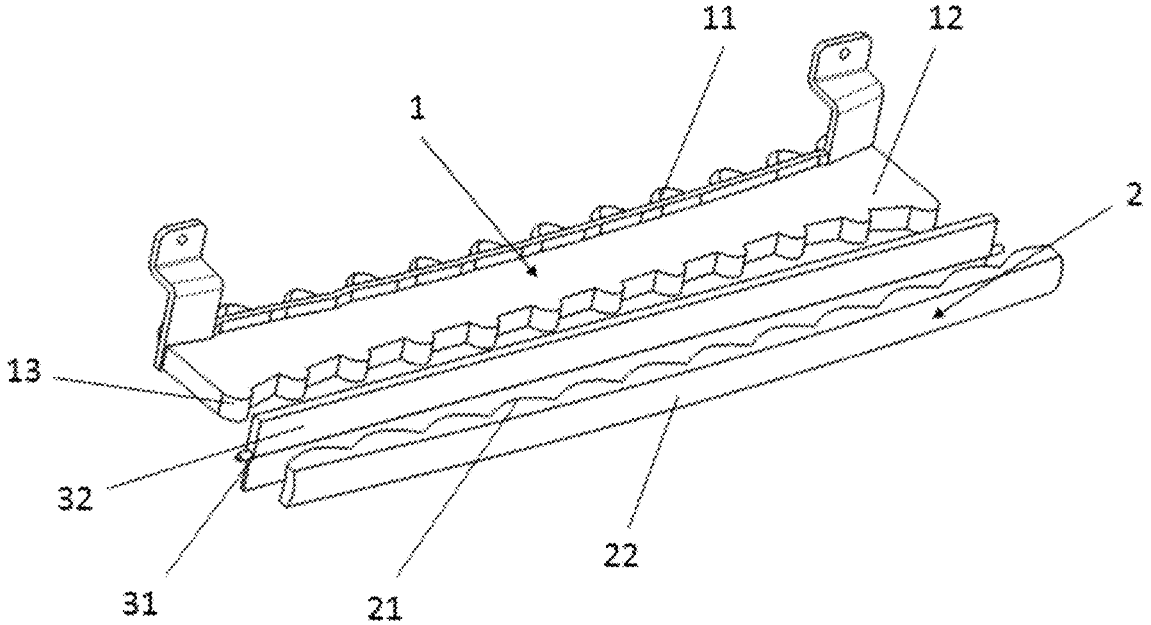
FIG. 4 is a schematic diagram of a second working state of an automotive headlamp system in an embodiment of the present disclosure.
Figure 5:
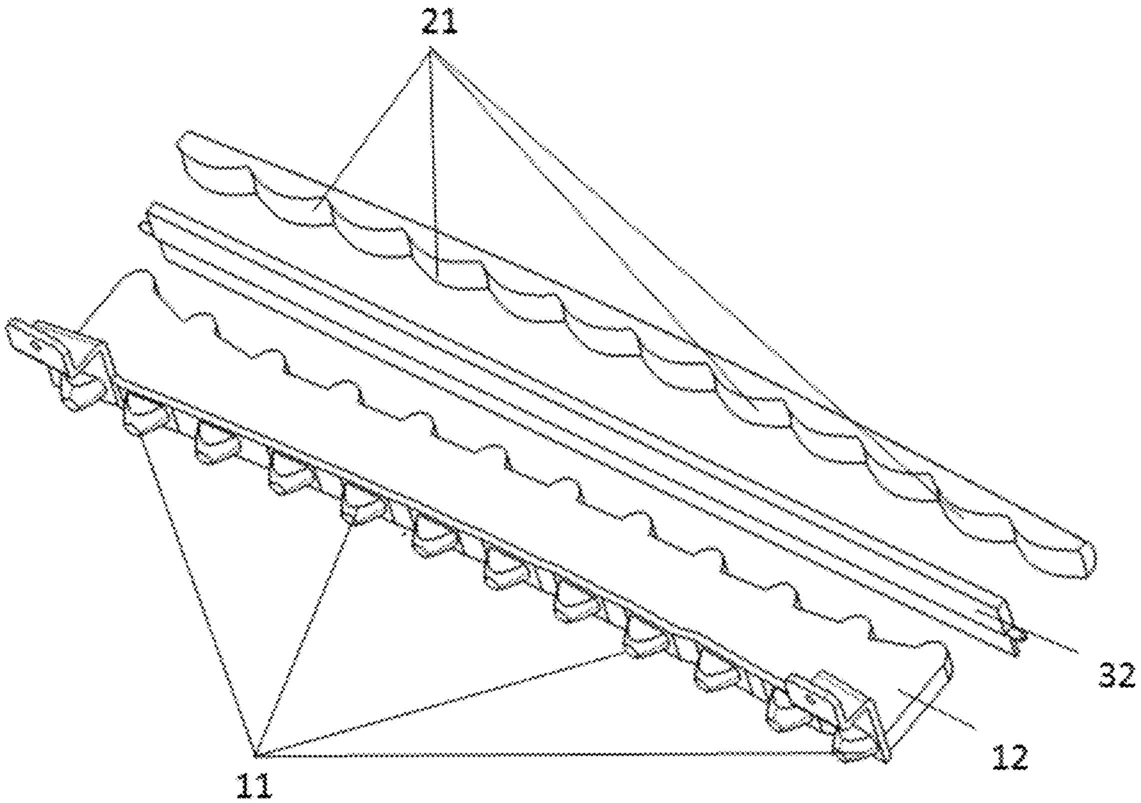
FIG. 5 is a schematic diagram of FIG. 4 seen from a rear top.
Figure 6:
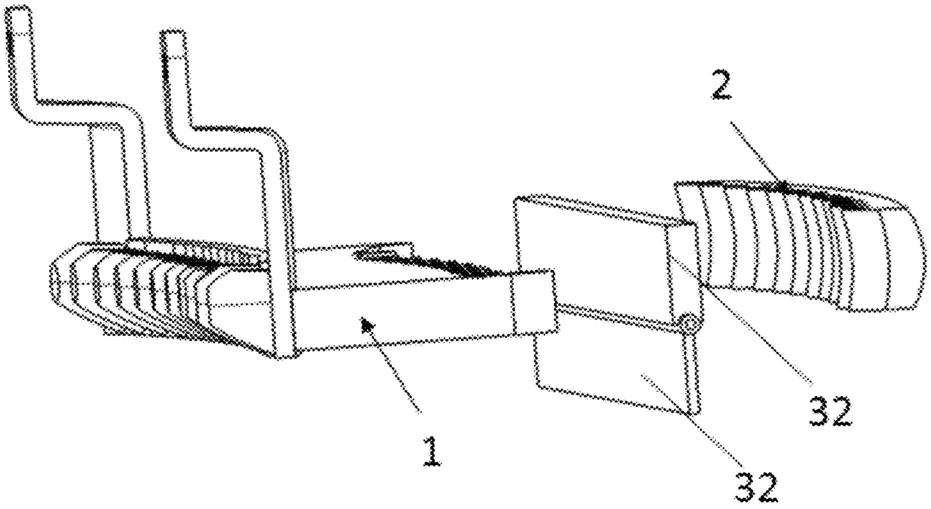
FIG. 6 is a schematic diagram of FIG. 4 seen from a side.
Figure 7:
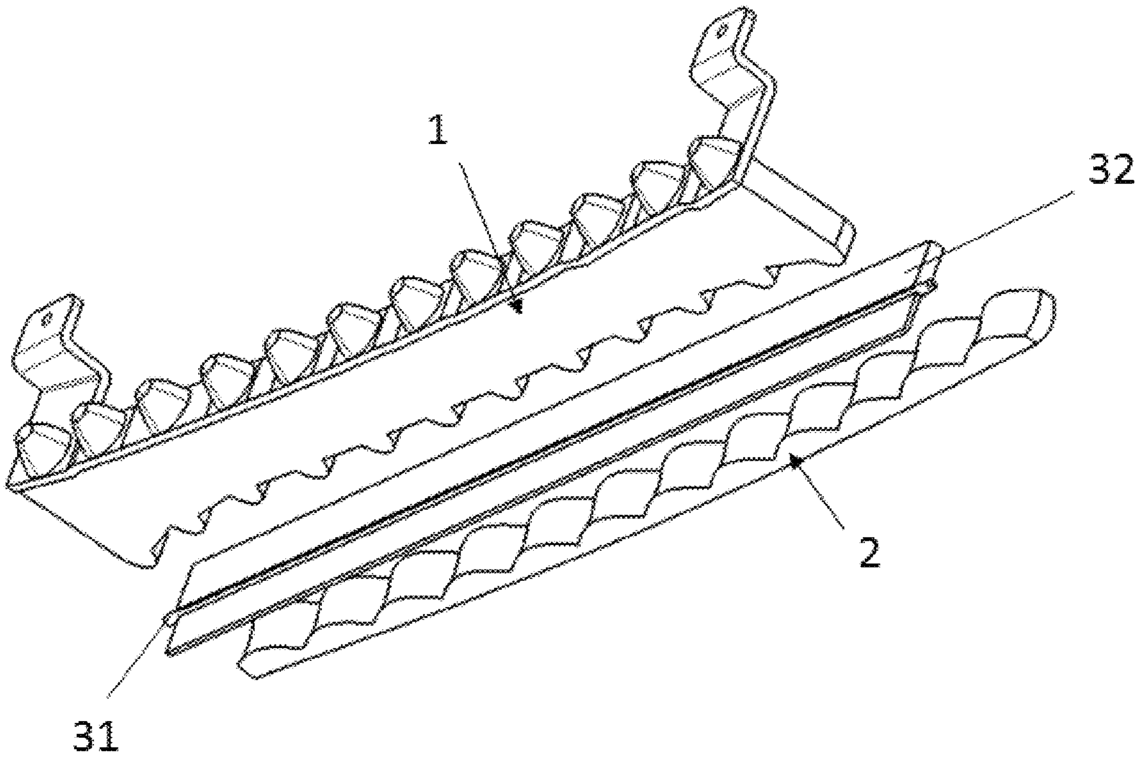
FIG. 7 is a schematic diagram of FIG. 4 seen from a bottom.
Figure 8:
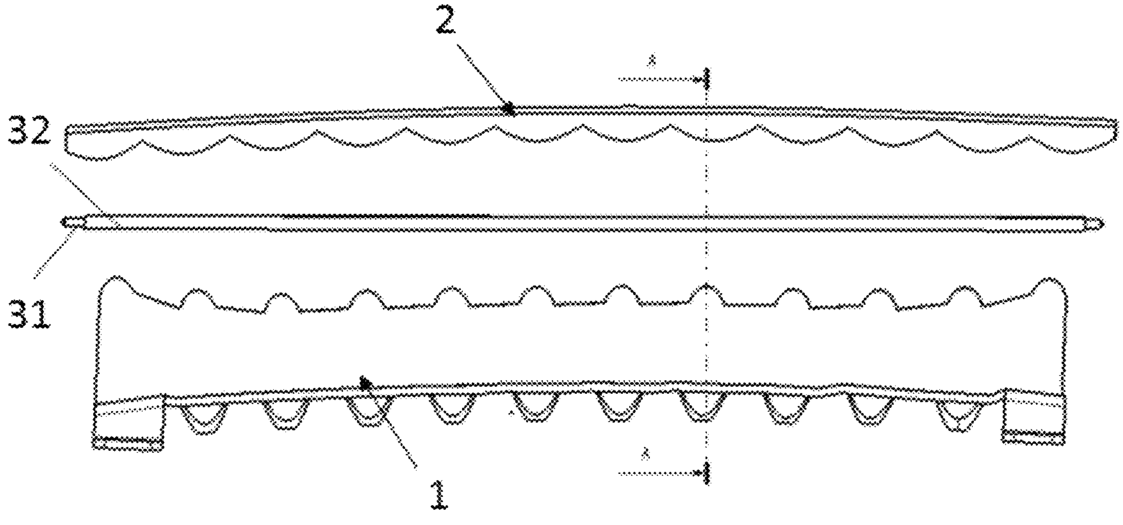
FIG. 8 is a vertical view of FIG. 4.

The driving beam module has four working states: As shown in FIG. 1 to FIG. 3, the light-transmitting plates 32 are rotated to a horizontal state, and light from the light sources are emitted by the primary optical element and then is directly emitted by the secondary optical element 2 to be as illumination light, without passing through any light-transmitting plate 32, that is, the signal lamp structure does not participate in light transmission. After the daytime running light is turned on, as shown in FIG. 4 to FIG. 9, a rotating shaft 31 controls the light-transmitting plates 32 to rotate 90°, so that the light-transmitting plate 32 that correspondingly realizes the function of the daytime running light stands in front of the light emitting portion of the primary optical element 1 (along the light emitting direction). At this time, light emitted from the light emitting portion of the primary optical element 1 passes through the light-transmitting plate 32 above the rotating shaft 31, and then the function of the daytime running light is realized by means of the secondary optical element 2. The light-transmitting plate 32 plays the roles of diverging the light to make light distribution uniform on the one hand, and projecting part of the light to make the finally output illumination intensity meet the light distribution (illumination) requirement of the daytime running light on the other hand. On the basis of the above structure of the daytime running light, the function of the front position lamp can also be realized, which differs in that the requirement on the illumination intensity of the front position lamp is low. Therefore, one set of structure can be commonly used by the daytime running light and the front position lamp by means of controlling the luminous flux of the light sources. After the turning light is turned on, the rotating shaft 31 drives the light-transmitting portion to rotate, so that the light-transmitting plate 32 that correspondingly realizes the function of the turning light is located directly in front of the primary optical element 1, wherein the light-transmitting manner is the same as that of the daytime running light.

From the above description, it can be seen that the present disclosure has the following advantages: The light-transmitting plates 32 mounted on the rotating shaft 31 are directly arranged behind the secondary optical element 2 to replace the signal lamps in the prior art, thereby reducing the space occupied by the original signal lamps, decreasing the volume of a headlamp, and satisfying requirements on the miniaturization of an automotive lamp. In addition, the primary optical element 1 including the light condensing structures and the convex cylinders 13 can form light spots with the smaller width to prevent mutual fusion between adjacent light spots and improve the resolution of the light shape. Meanwhile, a novel signal lamp structure is provided. The plurality of light-transmitting plates 32 having different materials and/or different shapes are arranged, so that the same one automotive signal lamp structure can realize the functions of various signal lamps, which further decreases the volume of the headlamp. The light emitting surface 22 of the secondary optical element 2 is arranged in the manner of the smooth curved surface, so that the light emitting surface 22 of the secondary optical element 2 can be designed to be a curved surface adapting to the shape of a vehicle.

The preferred embodiments of the present disclosure are described above in detail with reference to the accompanying drawings. However, the present disclosure is not limited to the specific details in the foregoing embodiments. Various simple variations can be made to the technical solutions of the present disclosure within the technical concept of the present disclosure, and these simple variations all fall within the protection scope of the present disclosure.

In addition, it should be noted that the various specific technical features described in the above specific embodiments can be combined in any suitable manner without contradiction. In order to avoid unnecessary repetition, various possible combination modes will not be additionally described in the present disclosure.

In addition, various different embodiments of the present disclosure can also be optionally combined, and these combinations should also be regarded as the content disclosed in the present disclosure, as long as they do not violate the idea of the present disclosure.

The invention claimed is:

1. An automotive headlamp system, comprising a light source, a primary optical element, an automotive signal lamp structure, and a secondary optical element, which are arranged in sequence along a light emitting direction, wherein the automotive signal lamp structure includes a light-transmitting portion and a rotating shaft; the light-transmitting portion comprises at least one light-transmitting plate; the light-transmitting plate is mounted on the rotating shaft and can be driven to rotate by the rotating shaft so that, by means of rotation, light from the light source exits by means of the primary optical element, then selectively passes through one of the light-transmitting plates or does not pass through any one of the light-transmitting plates, and then is projected by means of the secondary optical element to achieve a corresponding signal lamp function or lighting function; the secondary optical element comprises a plurality of light entering surfaces and one light emitting surface; the plurality of light entering surfaces are formed as convex curved surfaces that are in one-to-one correspondence with the light source and protrude towards the primary optical element; and the light emitting surface is a smooth curved surface; the light emitting direction refers to an irradiating direction of emitted light of the automotive headlamp system.

2. The automotive headlamp system according to claim 1, wherein the light-transmitting portion comprises a plurality of light-transmitting plates, and the plurality of light-transmitting plates are different in material and/or shape.

3. The automotive headlamp system according to claim 1, wherein the light-transmitting portion comprises a plurality of light-transmitting plates, and the light entering surface and light emitting surface of the light-transmitting plate are both flat surfaces; or the light entering surface and light emitting surface of the light-transmitting plate are curved surface; or the light entering surface of the light-transmitting plate is flat surface, and the light emitting surface of the light-transmitting plate is curved surface.

4. The automotive headlamp system according to claim 1, wherein the light-transmitting portion comprises two or three light-transmitting plates.

5. The automotive headlamp system according to claim 1, wherein a top of the rotating shaft is not higher than a bottom of the primary optical element, or a bottom of the rotating shaft is not lower than a top of the primary optical element.

6. The automotive headlamp system according to claim 1, wherein the primary optical element comprises a light entering portion, a light guiding portion and a light emitting portion which are arranged in sequence along the light emitting direction and are formed into a whole; the light entering portion comprises a plurality of light condensing structures in one-to-one correspondence with the light sources; convex cylinders in one-to-one correspondence with the light condensing structures are formed on the light emitting portion; and the convex cylinders extend along an up-down direction.

7. The automotive headlamp system according to claim 6, wherein the light condensing structures are light condensing cup structures.

8. The automotive headlamp system according to claim 1, wherein the light emitting surface is a smooth curved surface which is formed in such a way that a vertical generating line moves along a preset curve; and the vertical generating line is a convex curve protruding away from the primary optical element.

9. The automotive headlamp system according to claim 1, wherein the light sources are configured to be independently turned on and turned off.

10. An automotive lamp, comprising the automotive headlamp system according to claim 1.

11. The automotive lamp according to claim 10, wherein the light-transmitting portion comprises a plurality of light-transmitting plates, and the plurality of light-transmitting plates are different in material and/or shape.

12. The automotive lamp according to claim 10, wherein the light-transmitting portion comprises a plurality of light-transmitting plates, and the light entering surface and light emitting surface of the light-transmitting plate are both flat surfaces; or the light entering surface and light emitting surface of the light-transmitting plate are curved surface; or the light entering surface of the light-transmitting plate is flat surface, and the light emitting surface of the light-transmitting plate is curved surface.

13. The automotive lamp according to claim 10, wherein the light-transmitting portion comprises two or three light-transmitting plates.

14. The automotive lamp according to claim 10, wherein a top of the rotating shaft is not higher than a bottom of the primary optical element, or a bottom of the rotating shaft is not lower than a top of the primary optical element.

15. The automotive lamp according to claim 10, wherein the primary optical element comprises a light entering portion, a light guiding portion and a light emitting portion which are arranged in sequence along the light emitting direction and are formed into a whole; the light entering portion comprises a plurality of light condensing structures in one-to-one correspondence with the light sources; convex cylinders in one-to-one correspondence with the light condensing structures are formed on the light emitting portion; and the convex cylinders extend along an up-down direction.

16. The automotive lamp according to claim 15, wherein the light condensing structures are light condensing cup structures.

17. The automotive lamp according to claim 10, wherein the light emitting surface is a smooth curved surface which is formed in such a way that a vertical generating line moves along a preset curve; and the vertical generating line is a convex curve protruding away from the primary optical element.

18. The automotive lamp according to claim 10, wherein the light sources are configured to be independently turned on and turned off.

* * * * *